(12) United States Patent
Su (10) Patent No.: US 8,464,991 B2
(45) Date of Patent: Jun. 18, 2013

(54) FIXING DEVICE FOR PLANAR DISPLAY PANEL

(75) Inventor: Ning Su, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 416 days.

(21) Appl. No.: 12/731,685

(22) Filed: Mar. 25, 2010

(65) Prior Publication Data

US 2010/0243841 A1    Sep. 30, 2010

(30) Foreign Application Priority Data

Mar. 26, 2009   (CN) ...................... 2009 2 0106493 U (51) Int. Cl.
   *B25B 5/02*   (2006.01)

(52) U.S. Cl.
   USPC .................. 248/346.06; 248/346.03; 248/154

(58) Field of Classification Search
   USPC ................... 248/297.21, 468, 488, 490, 491, 248/229.12, 229.14, 229.22, 229.24, 231.41, 248/231.61, 316.4, 231.9, 346.05–346.07, 248/509, 220.41–220.43, 499, 220.31, 670, 248/154, 310, 501, 503.1, 346.03–346.04; 403/166, 304, DIG. 4, 326; 108/28, 50.11; 269/97–100, 3, 6, 95, 254 CS; 410/104–105; 144/144.1, 144.51, 145.1, 2.1, 1.1, 253.1–253.9, 144/285, 286.1, 286.5, 287
   See application file for complete search history.

(56) References Cited

U.S. PATENT DOCUMENTS

| | | | | |
|---|---|---|---|---|
| 4,170,345 | A * | 10/1979 | Townsend | 269/88 |
| 4,196,897 | A * | 4/1980 | Gordon | 269/99 |
| 4,233,730 | A * | 11/1980 | Godbe | 29/727 |
| 5,052,454 | A * | 10/1991 | Meinhardt | 144/144.51 |
| 5,255,901 | A * | 10/1993 | Rottler | 269/99 |
| 5,326,147 | A * | 7/1994 | Watson | 294/162 |
| 5,499,802 | A * | 3/1996 | Haberle | 269/99 |
| 5,850,680 | A * | 12/1998 | Verrier et al. | 29/257 |
| 6,811,131 | B2 * | 11/2004 | Kuo | 248/346.03 |
| 7,156,593 | B1 * | 1/2007 | Saward et al. | 410/104 |
| 2004/0007651 | A1 * | 1/2004 | Williams et al. | 248/346.06 |
| 2010/0230882 | A1 * | 9/2010 | Zhang | 269/97 |

* cited by examiner

*Primary Examiner* — Terrell McKinnon
*Assistant Examiner* — Ingrid M Weinhold
(74) *Attorney, Agent, or Firm* — Ladas & Parry LLP (57) ABSTRACT

A fixing device for a planar display panel includes a fastening fixture for fixing the planar display panel on a carrier stage in which a plurality of slide slots are provided. The fastening fixture includes a driving rod capable of being inserted into one of the slide slots, a fixture body and a bottom plate. The driving rod is connected with the fixture body and the bottom plate, which are respectively provided on two sides of the carrier stage in operation, and a spring is wound around the driving rod and capable of driving the bottom plate to move.

5 Claims, 7 Drawing Sheets

FIXING DEVICE FOR PLANAR DISPLAY PANEL

BACKGROUND

The present invention relates to a fixing device for fixing a planar display panel.

In manufacturing a planar display panel, usually the planar display panel needs to be fixed on a carrier stage for further processing or testing. For example, in the testing phase of the planar display panel, the planar display panel usually needs to be fixed on a carrier stage and supplied with electrical power. Since the carrier stage is used for various planar display panels with different sizes, it shall be provided with a fixture for adjusting and fixing the positions of the device placed thereon. By adjusting these fixtures, the planar display panels with different sizes can be fixed on the carrier stages steadily.

Conventional fixtures generally work by using adjusting screws, that is, the fixtures are positioned and fixed on the carrier stage with screws. The position and tightness of each fixture on the carrier stage can be adjusted by changing the tightness of the screws. However, in order to fix an object with the fixtures on the carrier stage steadily, the screws have to be turned as tightly as possible, however during adjusting the positions of the fixtures, the screws have to be first turned loosely so that the fixtures can be moved, which makes adjusting and the moving of the fixtures inconvenient. In addition, since the screws have to be turned every time when the positions of the fixtures are adjusted, the nut at the bottom of each screw is very possible to be lost because of the multiple tightening and loosing operations of this screw. However, it is really troublesome and time-consuming to reinstall the nut for a normal operation. Another consideration is that the fastening member at the bottom of the fixture shall has a width larger than that of the slide slot of the carrier stage in which the fixture is placed, so the parts of the fixture has to be amounted on the carrier stage one by one into a complete unit, which is laboursome and time-consuming.

SUMMARY

An embodiment of the present invention provides a fixing device for a planar display panel, including a fastening fixture for fixing the planar display panel on a carrier stage in which a plurality of slide slots are provided. The fastening fixture includes a driving rod capable of being inserted into one of the slide slots, a fixture body and a bottom plate. The driving rod is connected with the fixture body and the bottom plate, which are respectively provided on two sides of the carrier stage in operation, and a spring is wound around the driving rod and capable of driving the bottom plate to move.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE EMBODIMENTS

Embodiments of the present invention will hereinafter be described in detail with reference to accompanying drawings.

The embodiments of the present invention provide a fixing device for a planar display panel that includes a fastening fixture for fixing the planar display panel on a carrier stage, in which a plurality of slide slots are provided. The fastening fixture includes a driving rod capable of being inserted into one of the slide slots, a fixture body and a bottom plate. The driving rod is connected with the fixture body and the bottom plate, which are respectively provided on two sides of the carrier stage in operation, and a spring is wound around the driving rod and capable of driving the bottom plate to move.

The fastening fixture in the fixing device for a planar display panel of the embodiments can fix the planar display panel on a carrier stage, in which a plurality of slide slots are provided for moving the fastening fixture, the bottom plate can be moved by the elastic force of the spring, which interacts with the driving rod, to leave from or approaching the fixture body. When the bottom plate is moved away from the fixture body, the fastening fixture can be moved on the carrier stage; on the other hand, when the bottom plate is fixed with respect to the fixture body, the planar display pane can be fixed on the carrier stage, thus achieving quick and easy mounting operations of the planar display panel on the carrier stage by the fixing device.

Figure 1:
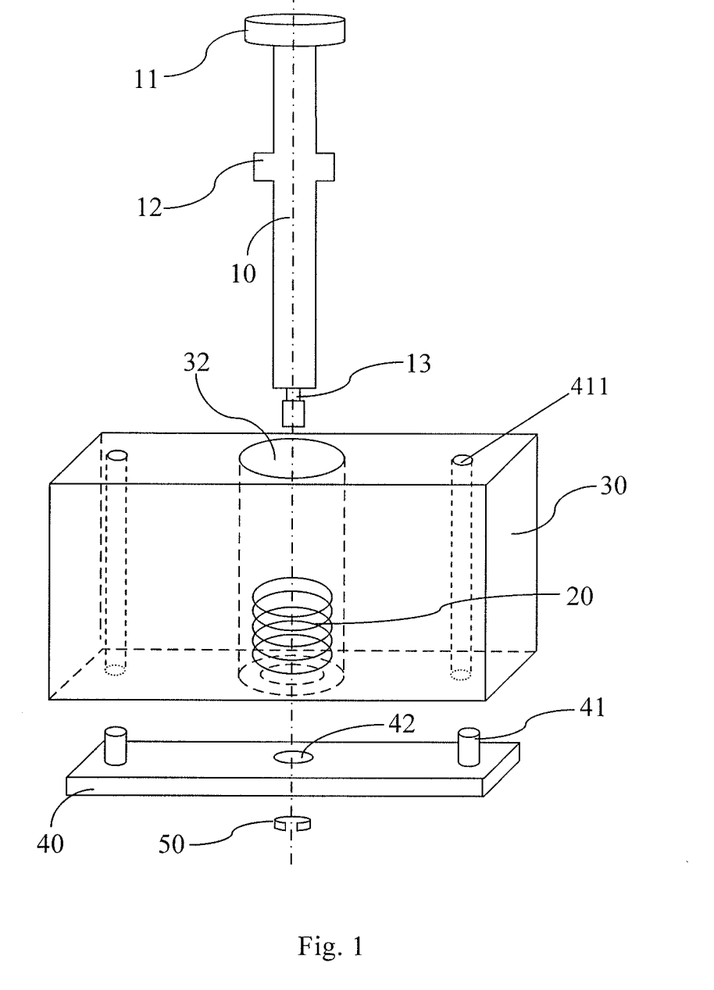
FIG. 1 is a schematic view shows the configuration of the fastening fixture of the fixing device for a planar display panel in a first embodiment of present invention.

FIG. 1 is a schematic view showing the configuration of a fastening fixture of a fixing device for a planar display panel in a first embodiment of present invention. As shown in FIG. 1, the fastening fixture in this embodiment may include a driving rod 10, a spring 20, a fixture body 30 and a bottom plate 40.

The driving rod 10 is inserted into a slide slot of a carrier stage and connects the fixture body 30 and bottom plate 40. The driving rod 10 is provided with a press lever 11 at one end and is provided with a first overhang lever 12. The spring 20 is wound around the driving rod 10 and inserted into a first through hole 32 formed in the fixture body 30. The length of the first overhang lever 12 is larger than the diameter of the spring 20, and the diameter of the bottom end of the first through hole 32 is smaller than the diameter of the spring 20. The other end of the driving rod 10 is connected with the bottom plate 40. When the fastening fixture is in use, the press lever 11 can be pressed and rotated so as to compress the spring 20 and rotate the bottom plate 40. When the press lever 11 is pressed downwards, the first overhang lever 12 applies a force on the spring 20 directly. The first overhang lever 12 may be of an in-line shape or a crossed shape, but not limited to such shapes, other shapes may be applicable so long as it can function to press the spring.

The fixture body 30 and the bottom plate 40 are disposed at one side of the carrier stage, respectively, opposing to each other. The fixture body 30 is provided with the first through hole 32, into which the driving rod 10 is inserted.

The other end of the driving rod 10 is connected with the bottom plate 40. Specifically, the driving rod 10 can be fixedly connected with the bottom plate 40 in the following manner. For example, a second through hole 42 is provided in the bottom plate 40, and a catch slot 13, which is provided at the end of the driving rod 10 for connecting the bottom plate 40, is caught in the second through hole 42. The shape of the second through hole 42 corresponds to the shape of the catch slot 13, that is, the shape of the second through hole 42 is suitable for holding of the catch slot 13. The fastening fixture further includes a catch ring 50 corresponding to the catch slot 13. The catch ring 50 engages the catch slot 13 to connect the driving rod 10 with the bottom plate 40, so that the driving rod 10 can drive the bottom plate 40 to rotate. Other connection manners may be selected as necessary, for example, a screw connection manner.

Preferably, a plurality of groups of locating holes are provided at each side of the slide slot of the carrier stage, and locating pins 41 are provided corresponding to the locating holes at each end of the bottom plate 14 to further fix the planar display panel.

In order to further fix the fixture body 30 and in turn fix the planar display panel, a catch hole 411 can be provided in the fixture body 30 corresponding to the locating pins 41. When the fastening fixture is in a state where the spring is restored, the locating pins can be inserted into the catch hole 411, and therefore, when the bottom plate 40 is fixed on the carrier stage by locating pins 41, the fixture body 30 can be fixed because the locating pins 41 are engaged in the catch hole 411.

The operations of the fixing device for a planar display panel of this embodiment will be described with referent to FIGS. 2-5.

Figure 2:
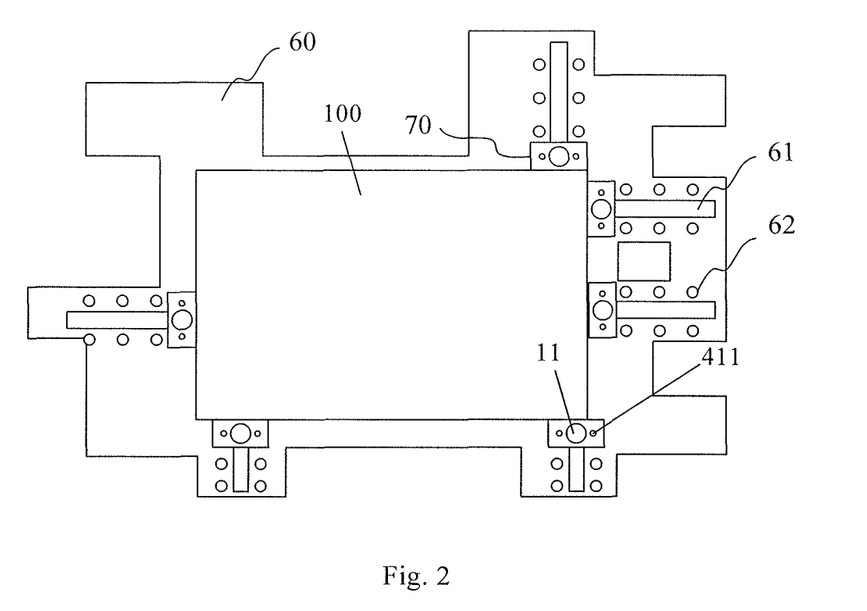
FIG. 2 is a schematic view shows the configuration of the fixing device for a planar display panel in the first embodiment of present invention.
Figure 3:
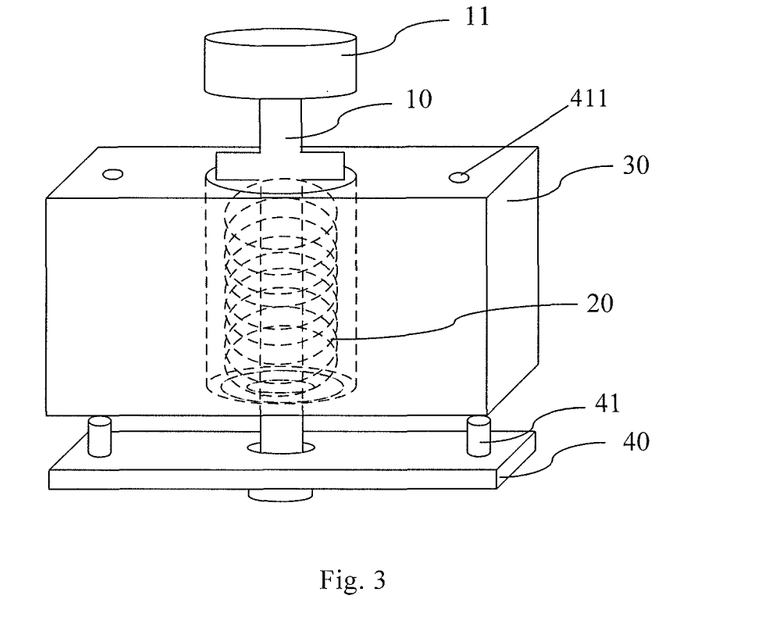
FIG. 3 is a schematic view shows the configuration of the fastening fixture of the fixing device for a planar display panel in the first embodiment of present invention, with the spring being in a restored state.
Figure 4:
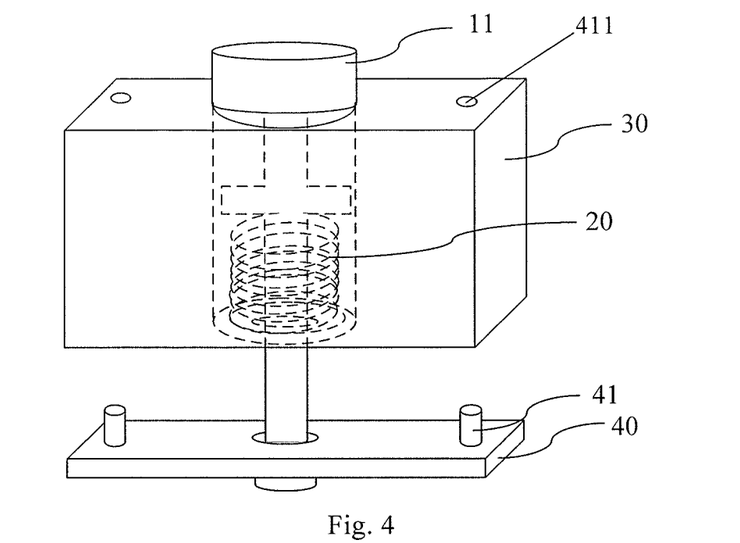
FIG. 4 is a schematic view shows the configuration of the fastening fixture of the fixing device for a planar display panel in the first embodiment of present invention, with the spring being in a compressed state.
Figure 5:
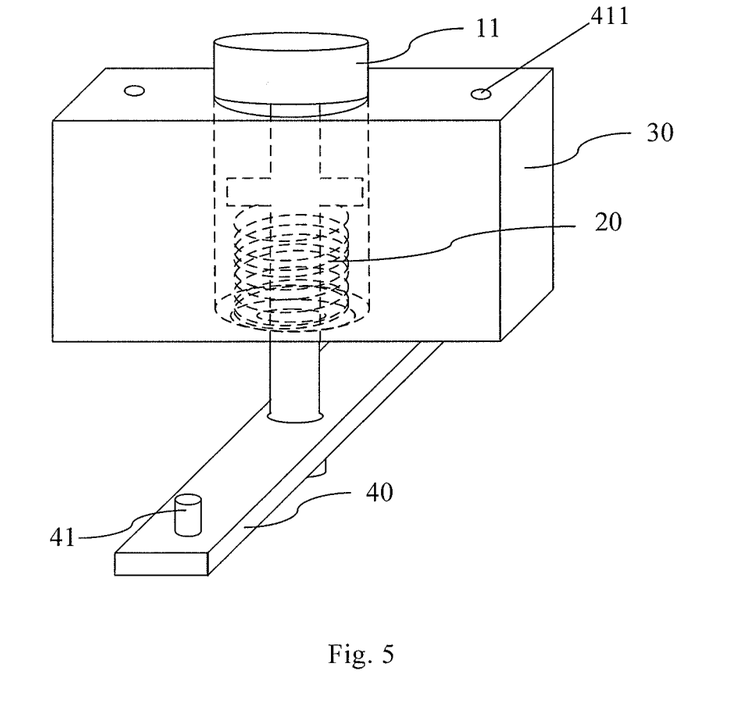
FIG. 5 is a schematic view shows the configuration of the fastening fixture of the fixing device for a planar display panel in the first embodiment of present invention, with the bottom plate being in a rotated state.

FIG. 2 is a schematic view shows the configuration of the fixing device for a planar display panel in the first embodiment of present invention. FIG. 3 is a schematic view shows the configuration of the fastening fixture of the fixing device for a planar display panel in the first embodiment of present invention, with the spring being in a restored state. FIG. 4 is a schematic view shows the configuration of the fastening fixture of the fixing device for a planar display panel in the first embodiment of present invention, with the spring being in a compressed state. FIG. 5 is a schematic view shows the configuration of the fastening fixture of the fixing device for a planar display panel 100 in the first embodiment of present invention, with the bottom plate being in a rotated state.

As shown in FIG. 2, a plurality of slide slots 61 are provided in the carrier stage 60. Preferably, a plurality of groups of locating holes 62 are provided at two sides of each slide slot 61, the fastening fixtures 70 are mounted on the carrier stage 60 as shown in the FIG. 2. The fastening fixture to be mounted, i.e., the fastening fixture with the spring being in a restored state, is as shown in FIG. 3. During mounting the fastening fixture 70, the press lever 11 is pressed firstly, and the first overhang lever 12 applies a force on the spring 20 directly, so that the spring 20 is compressed. Moreover, since the press lever 11, the driving rod 10 and the bottom plate 40 are connected with each other, the bottom plate 40 is moved downwards when the press lever 11 is pressed downwards, so that the bottom plate 40 leaves away from the fixture body 30, as shown in FIG. 4, in which the spring in the fastening fixture is compressed. To facilitate the mounting operation, the bottom plate 40 may have a width smaller than the width of the slide slot 61 of the carrier stage 60 and have a length smaller than the length of the slide slot 61. While the press lever 11 is rotated, as shown in FIG. 5, the bottom plate 40 is inserted into the slide slot 61. Then, the press lever 11 is further rotated, and the bottom plate 40 is rotated so that the locating pins 41 are positioned corresponding to the locating holes 62 of the carrier stage 60. At this time, the press lever 11 is released to make the spring 20 return to its original position, thus the driving rod 10 and the bottom 40 move upwards, which makes the locating pins 41 on the bottom plate 40 being inserted into the locating holes 62. Thus the mounting of the fastening fixture is finished. At the time of adjusting the position of the fastening fixture 70, the press lever 11 is pressed downwards to make the locating pins released from the locating holes 62 in the carrier stage 60, then the fastening fixture 70 is moved freely in the slide slot 61 to another desired position, and next, the press lever 11 is released, thus the fastening fixture 70 is fixed on the carrier stage 60. Furthermore, some catch holes 411 are provided in the fixture body 30 corresponding to the locating pins 41, when in a state of spring restoration, the locating pins 41 are inserted into the catch holes 411 to further fix the fixture body 30 and thus further improve the fixing effect with respect to the planar display panel 100.

The fixing device for a planar display panel in the present embodiment makes use of the spring restoration principle. The bottom plate can be driven to leave away from the fixture body or the carrier stage by compression of the spring with a press lever and can be rotated, so that the fixture can be assembled offline and installed and adjusted on the carrier stage quickly and simply.

Figure 6:
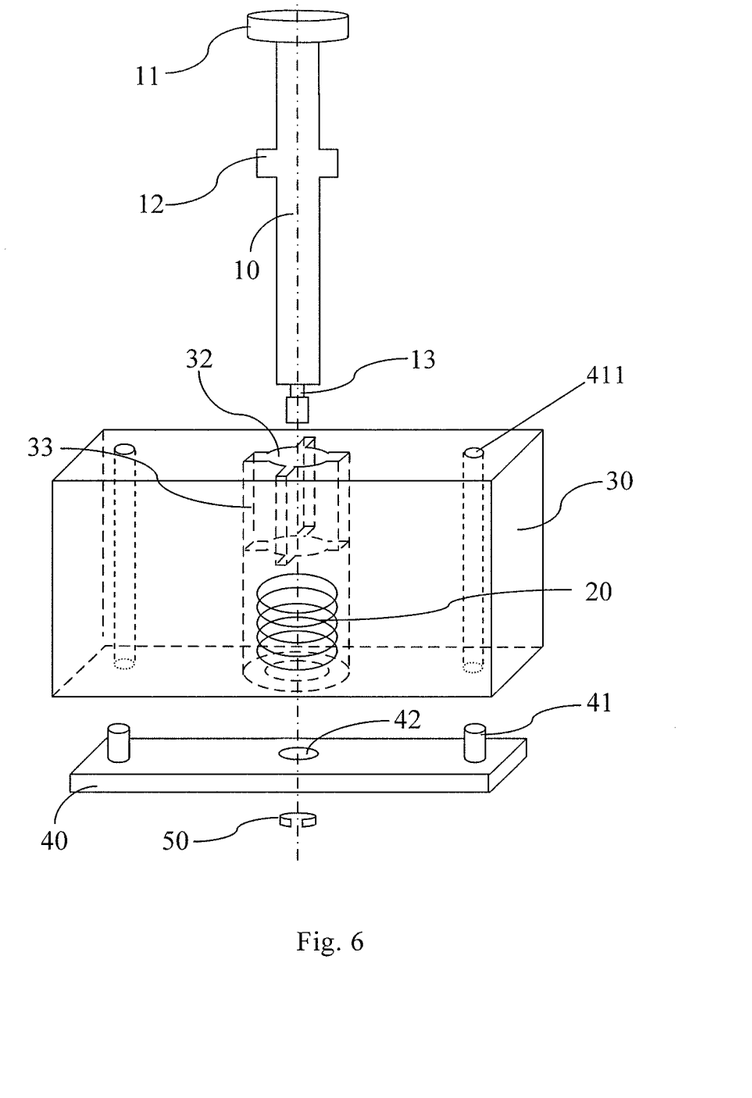
FIG. 6 is a schematic view shows the configuration of the fastening fixture of the fixing device for a planar display panel in a second embodiment of present invention.

FIG. 6 is a schematic view shows the configuration of the fastening fixture of the fixing device for a planar display panel in a second embodiment of present invention. As shown in FIG. 6, based configuration as that in the first embodiment, the fastening fixture in the second embodiment further includes the following components. A first groove 33 is provided in the inner wall of the first through hole 32 corresponding to the first overhang lever 12, the length of the first groove 33 is smaller than the depth of the first through hole 32, that is, the first groove 33 is provided in the upper part but not the lower part of the first through hole 32 corresponding to the first overhang lever 12, the width of the first groove 33 is equal to or slightly larger than the length of the first overhang lever 12, so that during the engagement of the first groove 33 and the first overhang lever 12 (i.e., the first overhang lever 12 is inserted into the first groove 33), the driving rod 10 can not rotate in the fixture body 30. The width of the first groove 33 is the diameter of the first through hole 32 adjacent to the first groove 33. The spring 20 is located in the cylinder part of the first through hole 32. As shown in FIG. 6, the first overhang lever 12 is of a in-line shape, while the first groove 33 corresponding thereto is of a crossed shape and provided in the inner wall of the first through hole 32. Obviously, the shape of the first overhang lever is not limited to an in-line shape, for example, the first overhang lever may be provided on one side of the driving rod 10. On the one hand, when the first overhang lever 12 is located in the first groove 33, the fixture body 30 is fixed and can not rotate, so that the planar display panel is immovable. On the other hand, when the first overhang lever 12 moves downwards and out of the first groove 33, it can rotate in the first through hole 32.

The operations of the fixing device for a planar display panel in the present embodiment are as follows. Firstly, the press lever 11 is pressed downwards, and because the press lever 11, the driving rod 10 and the bottom plate 40 are connected together, the bottom plate 40 is moved downwards by the pressing of the press lever so that the bottom plate 40 leaves away from the fixture body 30; at the same time, the first overhang lever 12 on the driving rod 10 is moved out of the first groove 33 and is inserted into the lower part of the first through hole 32 so as to rotate freely in the lower part of the first through hole 32; thus the first overhang lever applies a compressing force on the spring 20. Secondly, the press lever 11 is rotated to rotate the bottom plate 40. Thirdly, the bottom plate 40 is inserted into the slide slot in the carrier stage, and the press lever 11 is rotated again to rotate the bottom plate 40 into a position where the locating pins 41 are positioned corresponding to the locating holes 62 of the carrier stage 60. Fourthly, the press lever 11 is released to release the spring 20 which makes the driving rod 10 and the bottom plate 40 move upwards, so that the locating pins 41 on the bottom plate 40 are inserted into the locating holes 62 and the first overhang lever 12 moves back into the first groove 33 of the first through hole 32. Thus the mounting operations of the fastening fixture is finished.

During adjusting the position of one fastening fixture, the press lever 11 is pressed downwards so that the locating pins 41 moves out of the locating holes 62 and the first overhang lever 12 moves out of the first groove 33, thus the fastening fixture can be moved freely in the slide slot. Then, when the fastening fixture is moved to another desired position, the press lever 11 is released, and thus the fastening fixture is fixed on the carrier stage again. While the first overhang lever 12 is located in the first groove 33, the driving rod 10 can not rotate within the fixture body 30, that is, the fixture body 30 can not rotate around the driving rod 10, the first groove 33 acts to stable the fixture body. The fixture body may be further provided with catch holes 411 corresponding to the locating pins 41, which can be inserted into the catch holes 411 in a spring restoration state to fix the fixture body 30 and thus further fix the planar display panel.

In the second embodiment, besides the effect which is brought by the first embodiment, the fixture body is further fixed by an additional first groove.

Figure 7:
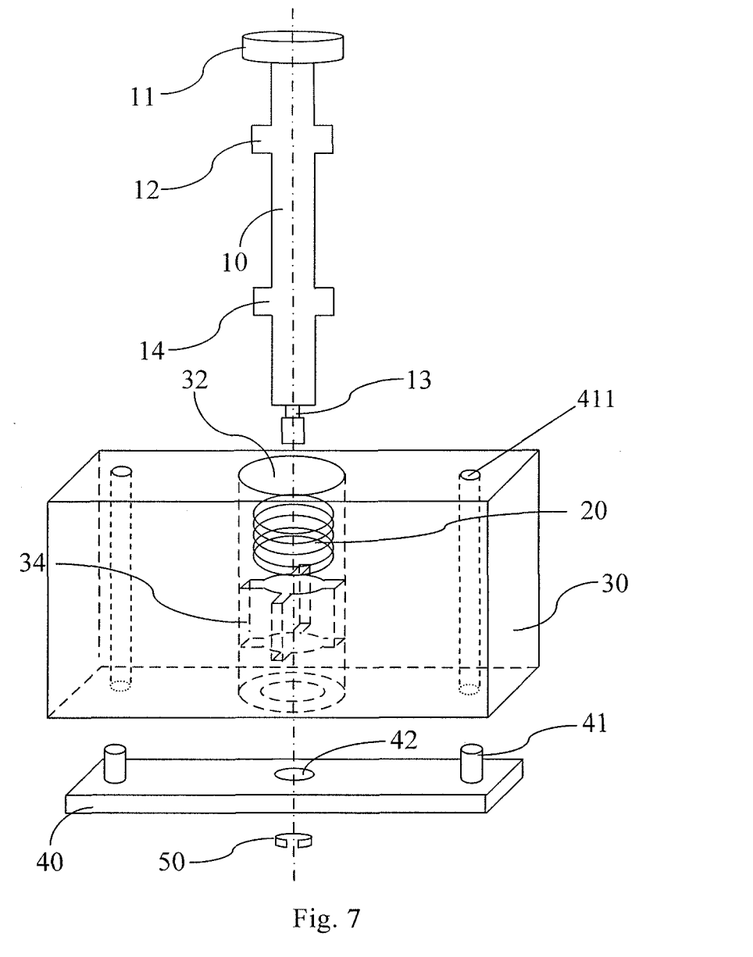
FIG. 7 is a schematic view shows the configuration of the fastening fixture of the fixing device for a planar display panel in a third embodiment of present invention.

FIG. 7 is a schematic view shows the configuration of the fastening fixture of the fixing device for a planar display panel in a third embodiment of present invention. As shown in FIG. 7, the fastening fixture in the third embodiment is different from the second embodiment in the following aspects. A second overhang lever 14 is additionally provided on the driving rod 10 at a position lower than the first overhang lever 12; a second groove 34 is provided in the inner wall of the first through hole 32 corresponding to the second overhang lever 14; the second groove 34 is located at the middle portion of the first through hole 32, that is, there is no groove in the upper and lower portions of the first through hole 32; the spring 20 is positioned in the upper portion of the first through hole 32 between the first overhang lever 12 and the second overhang lever 14 above the second groove 34. The arrangement of the second groove 34 and the second overhang lever 14 is similar to that of the first groove 33 and the first overhang lever 12 in the second embodiment, so details are omitted. The middle portion of the first through hole 32 has a diameter smaller than the diameters of the upper and the lower portions of the first through hole 32.

The operation of the fastening fixture in the third embodiment is different from that in the second embodiment. When the press lever 11 is pressed, the first overhang lever 12 applies a compression force on the spring 20 directly, and the second overhang lever 14 protrudes from the second groove 34 into the lower part of the first through hole 32 so as to be rotated freely therein; on the other hand, when the spring 20 is restored, the second overhang lever 14 returns to the second groove 34 in the first through hole 32. When the second overhang lever 14 is located in the second groove 34, the driving rod 10 can not rotate within the fixture body 30, that is, the fixture body 30 can not rotate around the driving rod 10, which fixes the carrier stage and in turn fix the planar display panel.

In the this embodiment, besides the effect which is brought by the second embodiment, the fixture body is further fixed by an additional second groove, so that the planar display panel can be further fixed in position.

Figure 8:
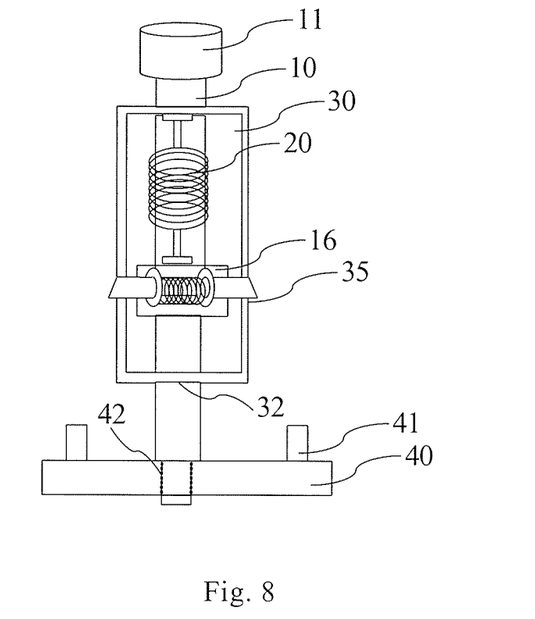
FIG. 8 is a schematic view shows the configuration of the fastening fixture of the fixing device for a planar display panel in a fourth embodiment of present invention, with the spring being in a stretched state.

FIG. 8 is a schematic view shows the configuration of the fastening fixture of the fixing device for a planar display panel in a forth embodiment of present invention, with the spring being in a stretched state. As shown in FIG. 8, the fastening fixture may include a driving rod 10, a spring 20, a fixture body 30 and a bottom plate 40.

The driving rod 10 is inserted into the slide slot on the carrier stage and connects the fixture body 30 and bottom plate 40. A first through hole 32 is provided in the fixture body 30, into which the driving rod is inserted. The driving rod 10 is provided with a press lever 11 at one end and is connected with the bottom plate 40 at the other end. A spring pin 16 is provided at the driving rod 10 vertically. The spring 20 is wound around the driving rod 10 and positioned in the first through hole 32. The spring 20 is connected with the fixture body 30 at one end and connected with the spring pin 16 at the other end, so that when the spring pin 16 moves downwards along with the driving rod 10, the spring 20 is stretched.

The fixture body 30 is disposed opposite to the bottom plate 40 to sandwich the carrier stage therebetween. The fixture body 30 is provided with the first through hole 32, into which the driving rod 10 is inserted.

The fixture body 30 is provided with a third through hole 35 corresponding to the spring pin 16, wherein the third through hole 35 is perpendicular to the first through hole 32, so that when the spring pin 16 moves to a position corresponding to the third through hole 35 along with the driving rod 10, the two ends of the spring pin 16 will protrude from the third through hole 35. As shown in FIG. 8, the two ends of the spring pin 16 may be two slopes, so that the two ends of the spring pin 16 can be retreated from the third through hole 35 into the first through hole 32 smoothly when a compression force is applied at the two ends of the spring pin 16. The two ends of the spring pin 16 may be in other shapes that is suitable for sliding.

The other end of the driving rod 10 is connected with the bottom plate 40 in the following manner. A second through hole 42 is provided in the bottom plate 40, into which the driving rod 10 is inserted, and the bottom plate 40 can rotate around the driving rod 10. A screw or a pin can be provided to fix the driving rod 10 and the bottom plate 40 together. A small bearing may also be provided between the driving rod 10 and the bottom plate 40 to improve the efficiency of the rotating of the bottom plate 40 with respect to the driving rod 10.

Preferably, a plurality of groups of locating holes are provided at two sides of each slide slot in the carrier stage, and a plurality of locating pins are provided at each end of the bottom plate 40 corresponding to the locating holes to further fix the planar display panel. Furthermore, catch holes may further be provided in the fixture body 30 corresponding to the locating pins 41. While the fastening fixture is in a spring restoration state, the locating pins can be inserted into the catch holes 411 to fix the fixture body 30 at the time when the bottom plate 40 is fixed in the carrier stage by locating pins 41.

Figure 9:
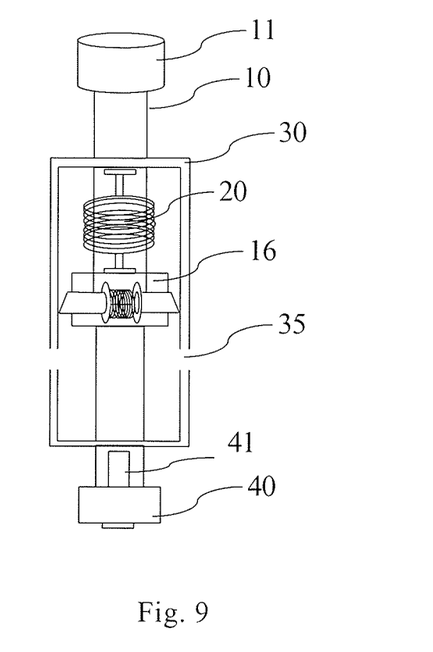
FIG. 9 is a schematic view shows the configuration of the fastening fixture of the fixing device for a planar display panel in the fourth embodiment of present invention, with the spring being in a restored state.

The operation of the fixing device for a planar display panel in the fourth embodiment of the invention will be described with reference to FIGS. 8 and 9. FIG. 8 shows the device in a spring-stretched state. FIG. 9 is a schematic view shows the configuration of the fastening fixture of the fixing device for a planar display panel in the fourth embodiment of present invention, with the spring being in a restored state.

The fastening fixture to be mounted is in a spring-restoration state as shown in FIG. 9. During mounting the fastening fixture, the press lever 11 is pressed firstly, the driving rod 10 moves the spring pin 16 and the bottom plate 40 downwards, the spring 20 is stretched in response to the movement of the spring pin 16. When the spring pin 16 moves to a position corresponding to the third through hole 35, the two ends of the spring pin 16 protrude from the third through hole 35. At this time, the components are fixed with respect to each other as shown in FIG. 8, that is, after the press lever 11 is released, the fixture body 30 keeps a distance away from the bottom plate 40. To facilitate the mounting, the width of the bottom plate 40 is smaller than the width of the slide slot of the carrier stage, and the length of the bottom plate 40 is smaller than that of the slide slot. The bottom plate 40 is inserted into the slide slot of the carrier stage and rotated to a position where the locating pins 41 are corresponding to the locating holes in the carrier stage, then the spring pin 16 is pressed into the fixture body 30 so that the stretched spring 20 is restored to move the driving rod 10 and the bottom plate 40 upwards, then the locating pins 41 are inserted into the locating holes in the carrier stage. Thus the mounting operations of the fastening fixture are finished here.

During adjusting the position of the fastening fixture, the press lever 11 is pressed downwards to make the locating pins 41 retreat from the catch holes 411 in the fixture body 30 and make the spring pin 16 protrude from the fixture body 30, so that the fastening fixture can be moved freely in the slide slot to another desired position, then the spring pin 16 is pressed into the fixture body 30 to fix the fastening fixture on the carrier stage. Catch holes may be further provided in the fixture body 30 corresponding to the locating pins 41 so that the locating pins are inserted into the catch holes to fix the fixture body 30 and in turn the planar display panel.

The fixing device for a planar display panel in the present embodiment adopts a spring pin to fix the fastening fixture in position, and also makes use of the spring restoration principle, which drives the bottom plate to leave away from the fixture body or the carrier stage by the compression of the spring with a press lever and to be rotated, so that the fixture can be assembled offline and can be installed and adjusted in the carrier stage quickly and simply.

Figure 10:
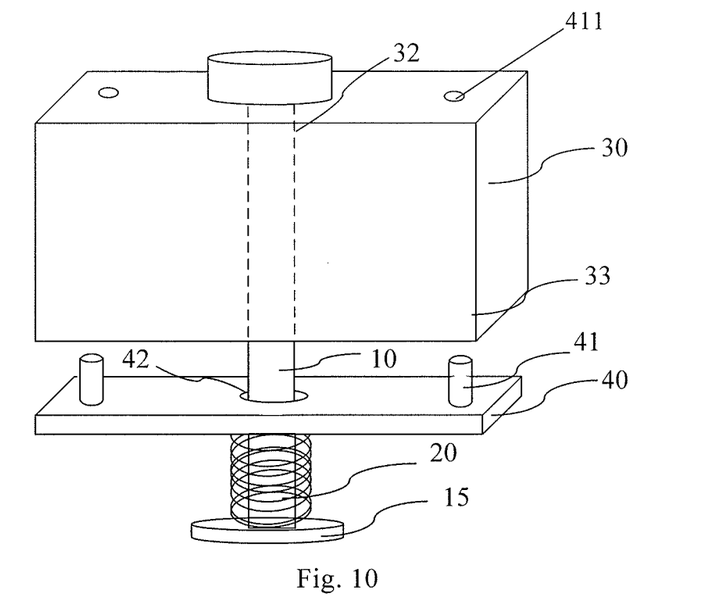
FIG. 10 is a schematic view shows the configuration of the fastening fixture of the fixing device for a planar display panel in the fifth embodiment of present invention, with the spring being in a restored state.

FIG. 10 is a schematic view shows the configuration of the fastening fixture of the fixing device for a planar display panel in a fifth embodiment of present invention. In FIG. 10, the fastening fixture may include a driving rod 10, a spring 20, a fixture body 30 and a bottom plate 40.

The driving rod 10 is inserted into the slide slot of the carrier stage, and connects the fixture body 30 and the bottom plate 40. The driving rod is connected with the fixture body 30 at one end and provided with a chassis 15 at the other end. The connection of the driving rod 10 with the fixture body 30 may be in the following manner. A first through hole 32 is provided within the fixture body 30, into which the driving rod 10 is inserted, and the driving rod 10 is attached to the fixture body.

The fixture body 30 is arranged opposite to the bottom plate 40 to sandwich the carrier stage therebetween. The bottom plate 40 is also provided with a second through hole 42, into which the driving rod 10 is inserted.

The spring 20 is wound around the driving rod 10 and the spring 20 is located between the bottom plate 40 and the chassis 15. The diameter of the chassis 15 is larger than that of the spring 20.

The driving rod 10 is inserted into the second through hole 42 of the bottom plate 40, and the bottom plate 40 can rotate around the driving rod 10.

Preferably, a plurality of groups of locating holes are provided at two sides of each slide slot in the carrier stage, and a plurality of locating pins are provided at two ends of the bottom plate 40 corresponding to the locating holes to further fix the planar display panel. Furthermore, catch holes may further be provided in the fixture body 30 corresponding to the locating pins 41. While the fastening fixture is in a spring restoration state, the locating pins can be inserted into the catch holes to fix the fixture body 30 when the bottom plate 40 is fixed on the carrier stage by locating pins 41.

Figure 11:
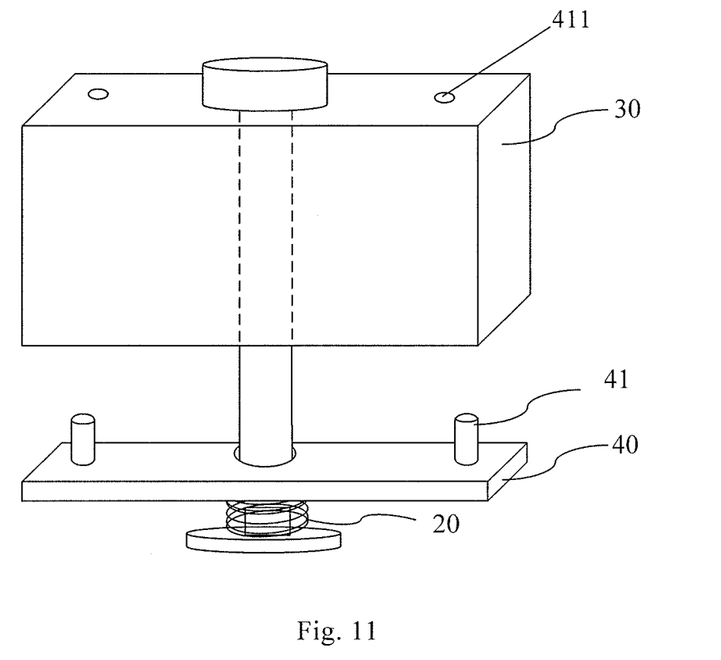
FIG. 11 is a schematic view shows the configuration of the fastening fixture of the fixing device for a planar display panel in the fifth embodiment of present invention, with the spring being in a compressed state.

The operations of the fixing device for a planar display panel in the fifth embodiment of the invention will be described with reference to FIGS. 10 and 11. FIG. 11 is a schematic view shows the configuration of the fastening fixture of the fixing device for a planar display panel in the fifth embodiment of present invention, with the spring being in a compressed state.

The fastening fixture to be mounted is in a spring-restoration state as shown in FIG. 10. During mounting the fastening fixture, the bottom plate 40 is pressed downwards to apply a compression force on the spring 20 so as to rotate the bottom plate 40 freely, as shown in FIG. 10. To facilitate the mounting, the width of the bottom plate 40 is smaller than the width of the slide slot of the carrier stage, and the length of the bottom plate 40 is smaller than that of the slide slot. The bottom plate 40 is inserted into the slide slot of the carrier stage and rotated to a position where the locating pins 41 corresponds to the locating holes in the carrier stage, then the bottom plate 40 is released so that the spring 20 is restored to move the bottom plate 40 upwards, and thus the locating pins 41 are inserted into the locating holes in the carrier stage to finish the mounting operation of the fastening fixture.

During adjusting the position of the fastening fixture, the bottom plate 40 is pressed downwards to make the locating pins 41 retreat from the locating holes in the carrier stage, so that the fastening fixture can be moved freely in the slide slot to a desired position, then the bottom plate 40 is released to fix the fastening fixture in the carrier stage. Catch holes may be further provided in the fixture body 30 corresponding to the locating pins 41, so that the locating pins 41 are inserted into the catch holes in a spring-restoration state to fix the fixture body 30 and in turn the planar display panel.

The fixing device for a planar display panel in the present embodiment makes use of a spring restoration principle, in which the bottom plate is pressed to be disengaged from the fixture body or the carrier stage by the compression of the spring with a press lever and to be rotated, so that the fixture can be assembled offline and can be installed and adjusted in the carrier stage quickly and simply.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A fixing device for a planar display panel, including a fastening fixture for fixing the planar display panel on a carrier stage in which a plurality of slide slots are located, wherein the fastening fixture includes:
    a driving rod capable of being inserted into one of the slide slots;
    a fixture body; and
    a bottom plate, wherein the driving rod is connected with the fixture body and the bottom plate, which are respectively located on two sides of the carrier stage in operation, and a spring is wound around the driving rod and capable of biasing the bottom plate towards the fixture body;
    wherein a through hole is provided in the fixture body, into which the driving rod is inserted, the driving rod is provided with a press lever at a first end and fixed on the bottom plate at a second end, a first overhang lever is located on the driving rod, the spring is disposed in the through hole under the first overhang lever, the first overhang lever has a length extending radially that is larger than the diameter of the spring, and the diameter of the through hole at a middle portion of the through hole is smaller than the diameter of the spring; and
    wherein a second overhang lever is located on the driving rod under the first overhang lever, a groove is located in an inner wall of the through hole at the middle portion of the through hole and adapted for the second overhang lever to slide therein, a length of the groove extending in an axial direction of the through hole is smaller than the depth of the through hole wherein the groove is not formed in an upper portion and a lower portion of the through hole, the spring is located above the groove and between the first and second overhang levers, and the groove has a length extending radially that is larger than or equal to a length extending radially of the second overhang lever, wherein pressing the press lever compresses the spring as the second overhang lever slides within the groove, the driving rod moving the bottom plate away from the carrier stage and allowing the position of the fastening fixture to be adjusted.

2. The fixing device as claimed in claim 1, wherein the first overhang lever is of an in-line shape or a crossed shape.

3. The fixing device as claimed in claim 1, wherein the second overhang lever is of an in-line shape or a crossed shape.

4. The fixing device as claimed in claim 1, wherein a plurality of groups of locating holes are provided at two sides of each slide slot, and locating pins are provided at two ends of the bottom plate corresponding to the locating holes.

5. The fixing device as claimed in claim 4, wherein catch holes are provided in the fixture body corresponding to the locating pins.

* * * * *